United States Patent [19]

Sämann

[11] Patent Number: 5,120,983
[45] Date of Patent: Jun. 9, 1992

[54] DEVICE FOR STARTING AUTOMATICALLY AN AUXILIARY UNIT WHEN SWITCHING ON A MAIN UNIT

[75] Inventor: Rudolf Sämann, Balin-Ostdorf, Fed. Rep. of Germany

[73] Assignee: BSG-Schalttechnik GmbH & Co, KG, Balingen, Fed. Rep. of Germany

[21] Appl. No.: 759,830

[22] Filed: Sep. 13, 1991

Related U.S. Application Data

[63] Continuation of Ser. No. 375,773, Jul. 5, 1989, abandoned.

[30] Foreign Application Priority Data

Jul. 5, 1988 [DE] Fed. Rep. of Germany ....... 3822633

[51] Int. Cl.⁵ .............................................. H02J 3/00
[52] U.S. Cl. ....................................... 307/38; 307/64; 323/300; 323/358
[58] Field of Search ................. 307/38, 39, 40, 41, 307/64; 323/299, 300, 357, 358

[56] References Cited

U.S. PATENT DOCUMENTS

| 4,070,586 | 1/1978 | Breslin | 307/22 |
|---|---|---|---|
| 4,245,319 | 1/1981 | Hedges | 307/38 |
| 4,325,045 | 4/1982 | Mehl | 336/213 |
| 4,328,459 | 5/1982 | McLeod, Jr. | 323/300 |
| 4,580,080 | 4/1986 | Smith | 323/300 |
| 4,667,262 | 5/1987 | Maier | 361/42 |
| 4,731,549 | 3/1988 | Hiddleson | 307/38 |
| 4,755,691 | 7/1988 | Bethea | 307/38 |

FOREIGN PATENT DOCUMENTS 3433352 3/1986 Fed. Rep. of Germany .
3621212 1/1987 Fed. Rep. of Germany .
3303126 6/1987 Fed. Rep. of Germany .

OTHER PUBLICATIONS

Electronic Design, vol. 29, No. 10, May 14, 1981, Seite 221 T. Gross: "Fast Current Limiter Protects Stalled Power Tools".

Primary Examiner—A. D. Pellinen
Assistant Examiner—Jeffrey A. Gaffin
Attorney, Agent, or Firm—Darby & Darby

[57] ABSTRACT

In connection with an automatic starting feature for an auxiliary unit, preferably a vacuum cleaner, which is switched on simultaneously when a main unit, for example an electric hand tool, a machine tool, or the like, is started it is proposed to trigger a conventional (phase) control circuit provided for the auxiliary unit by means of a current sensor taking the form of a ring-core bushing transformer in a manner such that the electric motor of the auxiliary unit is switched on with a certain delay (smooth-starting feature). The ring-core bushing transformer is designed in such a manner that, for producing clear firing pulses for the triac of the auxiliary unit, the primary winding is formed by the one turn of the electric supply line of the main unit and passed through the central opening of the ring core. The design of the ring-core bushing transformer is such that the transformer assumes the state of saturation when a predetermined output threshold value is reached so that even very high primary currents caused by the main unit during operation will not overdrive the (phase) control circuit and, in particular, not damage the triac.

11 Claims, 2 Drawing Sheets

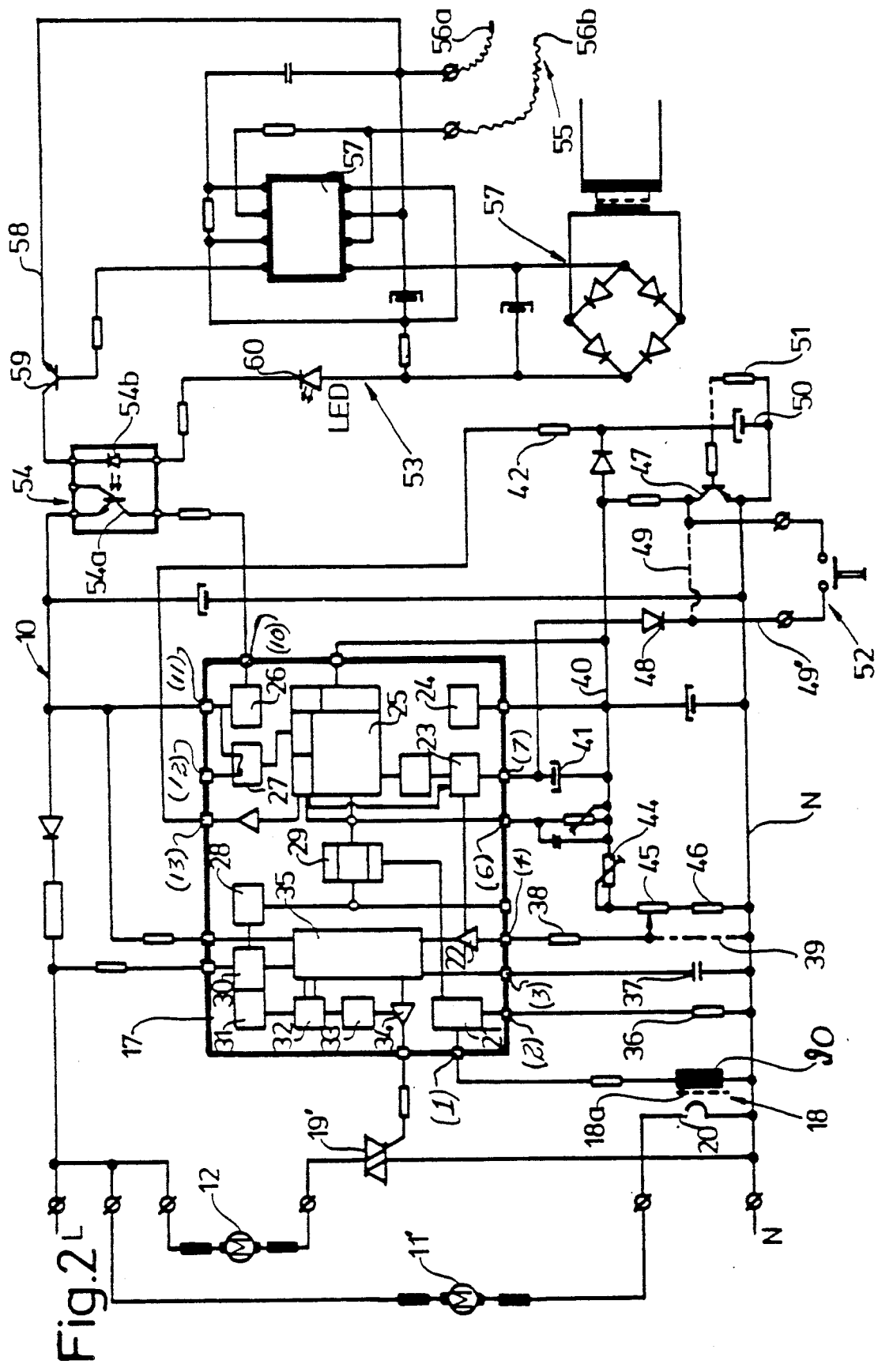

DEVICE FOR STARTING AUTOMATICALLY AN AUXILIARY UNIT WHEN SWITCHING ON A MAIN UNIT

This is a continuation of application Ser No. 375,773, filed Jul. 5, 1989 now abandoned.

BACKGROUND OF THE INVENTION

It has been known for some time to connect electric units, in particular electric hand tools or other working machines, to the mains, that is, the power source lines, via conventional phase control circuits to enable the speed, for example, of the unit to be controlled manually or to be maintained at a predetermined nominal value. In addition, it is also possible to design such conventional phase control circuits in such a manner that they provide a so-called smooth-starting feature when switching on the unit which prevents the generation of undesirable power-line load peaks which may occur in motor-driven units due to the high starting current and which may, for example, lead to fuse tripping.

Suitable phase control circuits are commercially available and are mostly constructed in the form of an integrated circuit (IC) offering a large number of external connections. Depending on the application for which it is intended, such a standard IC can be adapted as required, for example, used as a phase control by mounting additional external equipment, in accordance with the user's wishes, and in accordance with the connected electrical unit and the latter's requirements.

It has also been known to use an automatic starting system for switching on an auxiliary unit in combination with a main unit. Such an arrangement is described hereafter in more detail with reference to an electric hand tool producing, for example, dust or chips in combination with a vacuum cleaner intended for exhausting such chips. It goes, however, without saying that the invention described hereafter is by no means limited to this particular field of application.

It is highly desirable, and in fact usual practice in connection with the operation of certain electric hand tools, for example circular saws, planes, angle sanders, platten sanders, and basically in all cases where chips or dusts are produced in operation of these electric tools, to connect simultaneously an exhauster. The exhauster will then remove any particles occurring or produced during operation of the electric tool. Sometimes, such electric hand tools are already equipped with separate suction connections.

In order to ensure that such a vacuum cleaner or exhauster will operate only when the associated main unit is in operation, one has heretofore used an additional circuit by means of which the plug of the main unit, for example, can be fitted in, and connected to, a matching socket in the auxiliary unit. The auxiliary unit is then connected to the supply mains and feeds power to the auxiliary unit, in the present case the vacuum cleaner, and simultaneously controls the auxiliary unit. The auxiliary unit is provided with a current sensor, usually in the form of a transformer, for detecting the current absorbed by the main unit or external unit via the socket when the unit is started, and for supplying a signal to the IC of the phase control in the auxiliary unit. The auxiliary unit, or the IC of the phase control for the vacuum cleaner motor, then detects—by way of the current flowing to the main unit—that the latter has been started and causes the vacuum cleaner to start operating, too, in the way of an automatic starting control.

So, when an external unit, for example an angle sander with dust exhauster, is connected to the socket of the auxiliary unit, the dust exhauster will start operating, too, and exhaust any dust produced during the sanding operation. In this case, the operating current of the externally connected main unit flows through the primary winding of the transformer; the secondary current of the transformer is used in the IC of the phase control serving as automatic starting feature for triggering the latter's triac gate whereby the latter fires so that the dust exhauster starts operating, too.

However, such a known circuit numerous problems.

If an external unit with only small power consumption is connected, then one cannot exclude the possibility that the triac of the phase control may not receive sufficient ignition current, i.e. there is a risk that the triac may be damaged and fail due to so-called "hot spots" occurring as a result of this situation.

The simple approach to use a triac with sufficiently low ignition current does not, however, solve the problem as in the current-carrying condition of the triac, a voltage of approx. 1.5 to 2 V (to give some numerical values) is present at the triac gate, and energy is stored in this case in the secondary winding of the transformer even without any primary current. When in the zero current condition of the connected auxiliary unit, the triac is reset and no current flows on the primary side of the transformer from the main unit which when connected to the same mains (power source lines) then always assumes a zero current condition, the voltage present at the gate of the triac breaks down, too. However, this leads to the discharge of the energy stored in the transformer back into the gate and, accordingly, to repeated firing of the triac if the latter fires easily. This, too, may cause damage to the triac.

If, in contrast, a unit of high power is connected as an external unit (main unit) then the primary current and, accordingly, the secondary current, too, are normally so high that the current flowing into the gate of the triac exceeds by far the admissible maximum values which may again result in destruction of the triac.

Another problem connected with external units of high power lies in the fact that in the case of iron transformers using laminated stacks of sheets, the high primary current generates a field strength in the iron so high that the transformer will heat up heavily and may even be disconnected.

Now, it is the object of the present invention to remedy these disadvantages and to design a device ensuring automatic starting of an auxiliary unit when a main unit is switched on, so that, while external units of any desired power input can be connected, one still obtains at any time clear firing pulses for a triac controlling the auxiliary unit.

SUMMARY OF THE INVENTION

The invention provides the advantage that, due to the particular design of the transformer in the form of a ring-core bushing transformer, the current consumed by connected external units of low power is picked up correctly and transformed into firing pulses for the triac of the auxiliary unit very high primary currents do not result in firing pulses to the triac because the ring-core transformer has a saturation characteristic that will not continue to develop higher voltages at its secondary winding when such high primary currents are encountered.

It is, thus, ensured that the triac will be supplied with clear firing pulses for controlling the dust exhauster, but cannot be damaged itself under unusual low or high current conditions.

Another advantage of this arrangement lies in the fact that the material of the ring core of the transformer prevents excessive overheating due to saturation effects so that no overloading of the circuit as a result of overheating may occur, not even in the presence of high primary currents.

Another advantage is seen in the extremely low cost of the bushing transformer used when compared to the previous systems so that the circuit according to the invention is on the one had improved in all details as regards its functional safety, and is on the other hand cheaper to produce than the known systems.

The features permit advantageous developments and improvements of the device. The use of a conventional phase control (IC) provides the particularly advantageous possibility to implement a smooth-starting feature for the auxiliary unit, i.e. the dust exhauster, so that when the external unit with high power is switched on, the power line will not be additionally loaded by a high starting current from the dust exhauster. The circuit arrangements shown heretofore led quite frequently to tripping of the fuse as in these cases two units driven by electric motors were switched on almost simultaneously.

It is an additional advantage of the solution according to the invention that the response sensitivity can be adjusted and that it is possible to vary the speed of the dust exhauster (auxiliary unit) by varying the voltage applied to it in the switched-on condition.

Finally, the phase control of the IC makes it possible to implement a variable switch-off lag so that the auxiliary unit will continue to operate when operation of the main unit is interrupted briefly. In addition, this lag ensures that any dust occurring after the main unit has been stopped will be picked up and removed safely. Moreover, there is no need for switching off the auxiliary unit every time the main unit is stopped for a short period of time.

Another advantageous improvement of the present invention is in the fact that when used in connection with conventional vacuum cleaners of the type which are suited also for picking up water (water exhausters), the vacuum cleaner can be switched off in response to the water level in the tank, by means of the phase control.

Finally, there is also the possibility, by actuating an external switch, to operate the auxiliary unit independently, for example to use the exhauster as a normal vacuum cleaner, by shunting the automatic starting feature and varying the speed with the aid of the phase control.

BRIEF DESCRIPTION OF THE DRAWING

One embodiment of the invention will be described hereafter in more detail with reference to the drawing in which:

FIG. 2 is a block diagram in enlarged scale of the arrangement of FIG. 1, with the IC of a known phase control.

DESCRIPTION OF THE PREFERRED EMBODIMENTS

Figure 1:
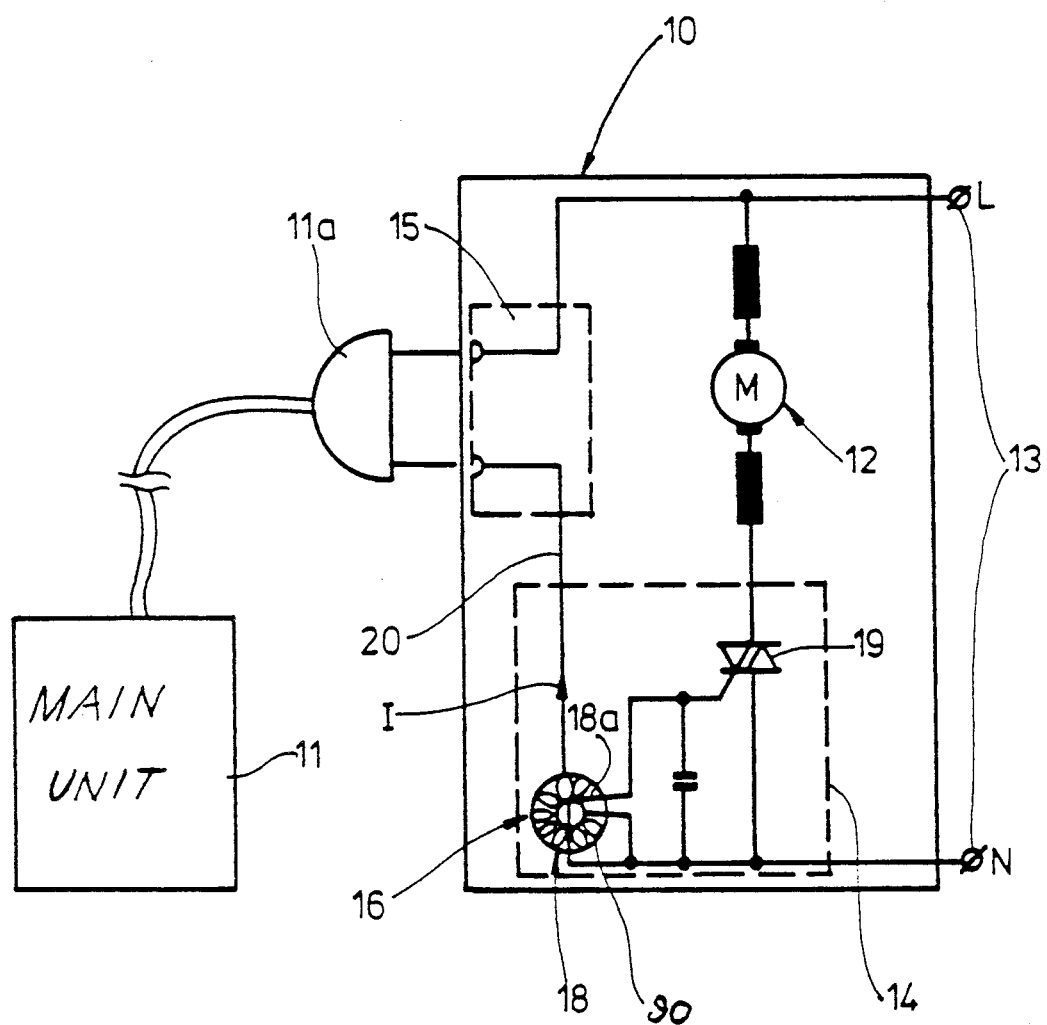
FIG. 1 shows a diagrammatic and very simplified representation of the basic arrangement for parallel operation of a main unit and an auxiliary unit, using the automatic starting feature.

In FIG. 1, an additional circuit 10 including an auxiliary unit 12, is provided. The circuit 10 enables a main unit 11, for example a drilling machine, a sander, a plane, circular saw or another electric hand tool or electric machine, to be connected, together with an auxiliary unit 12 to one and the same power supply 13 having connections L and N. Only the motor of the auxiliary unit 12 with its field windings is illustrated diagrammatically in FIG. 1. An automatic starting circuit 14 indicated by broken outlines, which is represented in FIG. 1 only very diagrammatically and which will be described in more detail further below, with reference to FIG. 2, enables the auxiliary unit 12, typically a vacuum cleaner, to be started automatically when the main unit 11 is switched on, for example, by inserting its plug 11a into a socket 15 of the additional circuit 10.

The main unit 11 then draws a current I, which may be stronger or weaker depending on particular characteristics of the unit 11. The current I is picked up by a current sensor 16 and utilized by the automatic starting circuit 14 for activating the drive motor 12 of the auxiliary unit. This is effected, preferably, by means of a phase control circuit of a known type, which is shown in FIG. 2 as the central component, surrounded by bold lines, and which is designated by reference numeral 17, in combination with certain supplementary peripheral equipment which will be discussed in more detail hereafter.

The before-mentioned problems encountered when the auxiliary unit is started simultaneously and automatically via the phase control circuit in the automatic starting circuit 14, are overcome largely by the fact that the current sensor 16 is designed as a ring-core bushing transformer 18 which supplies the automatic starting circuit with the necessary current pulses via the triac 19. The triac 19 is connected, in series with the motor connections of the auxiliary unit, to the same power supply L, N as the main unit 11. It will be easily seen that by responding to the current I of the main unit 11, an automatic starting circuit 14 is implemented including phase control and the triac 19. The triac for the auxiliary unit is supplied with clear firing pulses, in the present case for controlling the vacuum cleaner, without being exposed to the risk of damage.

This is achieved, to a substantial degree, by the selection of the material of the ring core 18a of the ring-core transformer. Proper material selection assures that on the one hand sufficiently clear pulses are applied to the secondary winding 90 of the ring-core bushing transformer, even in the presence of only small primary currents, while on the other hand no overloading of the circuit will occur in the presence of high and extremely high primary currents. The pulses of the secondary winding are supplied to the triac 19 of the automatic starting circuit 14.

This protective characteristic is due to the fact that the hysteresis curve for the material of the ring-core transformer is selected such that when a secondary voltage sufficiently high to permit the generation of clear firing pulses for the triac 19 is provided, the saturation level of the transformer is reached. As the primary currents rise. no additional voltage rise will occur in the transformer secondary, while on the other hand no overheating through saturation effects will occur, either.

It is particularly advantageous in this connection that the primary winding is designed as a single turn, formed by the electric supply line 20 extending to the socket 15 for the main unit. This supply wire 20 is passed through the central opening of the ring core, which is mounted in a suitable manner on a circuit board, a printed circuit board, or the like, or which may alternatively be held in place only by its two secondary connections, and may be bent off in the form of a stirrup, thus forming at the same time the before-mentioned single turn of the primary winding.

On the secondary side, such a ring-core bushing transformer 18 may then comprise, for example, 100 turns depending on the desired response sensitivity. One obtains in this manner high functional safety in all details, in combination with a particularly low-cost solution, as such a ring-core bushing transformer requires only little material, due to its small dimensions. The transformer can be wound and mounted on the circuit board without any problems, and as the single turn 20, serving simultaneously as supply line for the primary current to the socket 15 and from there to the main unit may be passed through a corresponding opening in the circuit board and at the same time through the central opening in the ring core of the transformer.

The use of such a ring core transformer is of particular advantage in combination with the detailed circuit illustrated in FIG. 2. This circuit most conveniently includes a monolithic integrated phase control circuit of a type commercially available and, therefore, known as such. It has been found that the component known under the designation U 2010 B and marketed by Telefunken is particularly well suited for this purpose. This component, which will be described hereafter simply as IC component, finds its main application in the field of universal motor control with load compensation and combines a number of characteristics in the known field of phase control circuits, such as full-wave power current sensing, mains voltage compensation, programmable power current limitation with overload and high power output, variable smooth-starting feature, voltage and current synchronization, and the like.

For the sake of improved understanding, the main functional blocks of the phase-control IC component 17 have been designated as follows in FIG. 2:

21 Power current detector (operational amplifier)
22 Level transformer
23 Smooth-starting feature
24 Reference voltage
25 Programmable overload cut-off
26 Supply voltage limitation
27 High power
28 Mains voltage compensation
29 Full-wave rectifier
30 Voltage detector
31 Limitation detector
232 Retriggering logic
33 Current detector
34 Output pulse generator
35 Phase control To the extent the components of FIG. 2 are comparable to those mentioned in connection with FIG. 1, these have been designated by the same reference numerals, sometimes supplemented by an apostrophe. The special equipment of the IC component (chip) provides additional preferred functions and improvements of the invention which will be discussed hereafter in connection with the discrete circuit elements connected to the individual external connections of the IC components.

The pin (1) serves as connection for the secondary winding of the ring-core bushing transformer 18; the resistor 36 connected to the pin (2) provides the ground connection for the operational amplifier in the IC component forming the power current detector. The capacitor 37 connected to the pin (3) and, to an even greater degree, the equipment connected to the pin (4) determine the function of the phase control of the block 35. If the pin (4) is only connected to ground through a resistor 38 via the line 39 indicated by broken lines, one obtains a predetermined constant speed for the auxiliary device which will be described hereafter as a vacuum cleaner for the purposes of the description, but without limiting the present invention, and which is indicated in FIG. 2 with its drive motor (12).

There is provided an external connection line 40 to which are connected a capacitor 41 connected to the pin (7) and, towards the lower supply line N, the emitter/collector line of a transistor 47 likewise connected to the pin (7), via a diode 48. The size of the capacitor 41 determines the time lag for the smooth-starting feature of the vacuum cleaner, and also its duration, which provides the advantage that when switching on the external main unit (with the higher power) the single mains supply line is not simultaneously loaded additionally by the high switch-on current produced by the motor of the vacuum cleaner. This prevents tripping of the fuse in the supply line, which would otherwise almost certainly occur. In addition, there are connected to this same line 40 the connection point (6) providing a feedback from the IC regarding the sensor input, and selectively—via the series connection of three resistors 44, 45, 46 (resistor 44 as trimmer and resistor 45 as potentiometer) the connection point (4), whereby it is rendered possible to vary the speed of the motor of the vacuum cleaner depending on the position of the potentiometer 45.

The external equipment connected to the IC component 17, and especially the connection of the pin (7), which also connects the smooth-starting capacitor 41, via the transistor 47, is necessary for the function of the automatic starting feature, in combination with the desired smooth-starting feature, because this additional circuit 10 is normally already connected to the supply line before the current sensor 16 signals that the main unit has been switched on. In order to ensure that in this case smooth starting can be effected, a (smooth-starting) command generated by the internal structure of the IC component is sent from the output of the connection point (13) via the resistor (42) to the base of the transistor (47) which until then has been in the conductive state and, consequently, had maintained the capacitor 41 in the discharged state. The inhibit instruction received from the pin (13) causes the transistor 47 to disconnect, i.e. to release the connection between the pin (7) and the connection line (49), via the diode 48 and between its own collector/emitter line and the lower connection line N.

The connection line 49 may advantageously also be replaced by a connection line 49' comprising a switch 52; it is for this reason that the connection line 49 has been indicated in the drawing only by broken lines. By opening the switch 52 it is then possible to change over the auxiliary unit to normal operation, i.e. without the automatic starting feature, in which case the speed can be varied by actuating the potentiometer 45.

Another advantageous improvement of the present invention resides in the fact that by connecting additionally the base circuit of the transistor 47 to a capacitor 50 of comparably high capacitance with a discharge resistor 51 connected in parallel, it is possible in connection with the envisaged automatic starting feature to effect a lag in switch-off of the vacuum cleaner for a predetermined period of time, depending on the rating of the capacitor 50. For, the capacitor 50 ensures that when the main unit has been switched off, i.e. when the current sensor 16 does no longer supply a "control signal", the capacitor 41 remains charged, i.e. is not discharged, for a predetermined period of time.

Finally, there is provided a supplementary circuit indicated generally by reference numeral 53 which is capable under certain conditions of switching off certain types of vacuum cleaners even when the main unit continues to operate. To this effect, the pins (10) and (11) of the supply voltage limiting feature are connected with each other, i.e. in the case of the illustrated embodiment by an optocoupler (or by another electric or electronic circuit element). In the illustrated embodiment, the optocoupler 54 is part of a water level sensor so that a switch-off command can be emitted in response to the water level in vaccum cleaners of the type suited also for collecting water. The circuit 53 constitutes in this particular embodiment, to which it is of course not limited, a switch-off arrangement for the vacuum cleaner operating in response to the water level in the tank of the vacuum cleaner.

There is provided for this purpose a water sensor 55, which may be formed in the usual manner by two sensor strips or sheet strips 56a, 56a which are fixed to the inner wall of the water tank. The strips are supplied with an alternating voltage of a suitable frequency via a control component 57. A d.c. current supply for the supplementary circuit 53 is indicated at 57. Once the "resistance" between the two water sensor elements 56a, 56b drops below a given threshold value, the control component 57, which may also consist of an IC of suitable design, connects an external circuit 58 to supply voltage. This connecting is effected for example by triggering a transistor 59 connected in series to the luminous diode 54b of the optocoupler 54, so that, simultaneously with the emission of an external water danger signal, the optocoupler 54 is caused to respond via an additional luminous diode 60, whereby the photo-sensitive element 54a interconnects the two pins (11) and (12). The control component 57 may consist of an IC known under the designation U 670 B, which is marketed by Telefunken.

All features mentioned or shown in the above description, the following claims and the drawing may be essential to the invention either alone or in any combination thereof.

I claim:

1. A device for automatically starting an auxiliary electrical unit when switching on a main electrical unit comprising a control circuit for detecting, by means of a current sensor (16), that the main unit has started and for starting the auxiliary unit, wherein the current sensor (16) is a ring-core bushing transformer (18) having its secondary winding (90) in the control circuit for the auxiliary unit (12) and having its primary winding in a supply line (20) for the main unit (11), said ring-core bushing transformer having a state of saturation without overloading and overheating when a predetermined primary current is reached, said predetermined primary current being in the low range of anticipated main unit operating currents and sufficient for generating firing pulses for a triac of said control circuit.

2. A device according to claim 1, wherein said auxiliary unit includes connection terminals, the control circuit being part of an additional circuit (10), said additional circuit including supply lines subject to connection to a supply voltage and connecting the connection terminals of the auxiliary unit across said lines for connection to said supply voltage via a triac (19,19') in series, the additional circuit comprising a socket for connection with the main unit (11), said socket being connected to said supply lines to the same supply voltage and, one said supply line is in circuit with said ring-core bushing transformer (18).

3. A device according to claim 2, further comprising a supplementary circuit (53), said supplementary circuit deactivating a portion of the control circuit under certain operating conditions of the auxiliary unit, said auxiliary unit not operating when the main unit is on.

4. A device according to claim 3, wherein said auxiliary unit is a water exhauster and further comprising water level sensors (56a,56b) for detecting the maximum admissible water level in the water exhauster, said sensors (56a,56b) being in circuit to activate the control circuit.

5. A device according to claim 4, wherein the water level sensors (56a,56b) activate said control circuit to switch off said auxiliary unit when a predetermined water level is exceeded.

6. A device according to claim 1, wherein the ring-core bushing transformer (18) comprises a secondary winding wound about a toroidal body of the ring core, said body having a central opening, the primary winding being formed by one turn of said one supply line connected to said socket for the main unit (11), said one supply line passing through the central opening of the ring core.

7. A device according to claim 6, wherein the auxiliary unit includes a motor and the control circuit includes a potentiometer (45) for regulating the speed of the motor of the auxiliary unit.

8. A device according to claim 6, wherein said auxiliary unit includes a motor and said control circuit includes a capacitor (41), for effecting smooth-starting of the motor of the auxiliary unit.

9. A device according to claim 8, wherein a discharge line is subject to connection in parallel to the smooth-starting capacitor (41), and the discharge line is connected when the current sensor (16) of the control circuit senses that the main unit (11) has started, the points in time when the two units, supplied with electrical power by the additional circuit (11), are switched on, are separated relative to each other.

10. A device according to claim 9, wherein a contact breaker (52) prevents discharging of the smooth-starting capacitor (41), normal operation of the vacuum cleaner, without the automatic starting feature, but with speed regulation by said potentiometer (45), is enabled when this contact breaker is actuated.

11. A device according to claim 9, wherein a triggering circuit for the smooth-starting capacitor (41) comprises a time-lagging element (50,51) which delays for a predetermined period of time a switching command to turn off said auxiliary unit when the main unit (11) is switched off, an after-running operation of the auxiliary unit being implemented.

* * * * *